United States Patent
Won et al.

(10) Patent No.: US 7,860,538 B2
(45) Date of Patent: Dec. 28, 2010

(54) MOBILE TERMINAL

(75) Inventors: Chang-Bai Won, Gyeonggi-Do (KR);
Jin-Hyung Jo, Gyeongsangnam-Do (KR); June-Wook Jeong, Incheon (KR)

(73) Assignee: LG Electronics Inc., Seoul (KR)

( * ) Notice: Subject to any disclaimer, the term of this patent is extended or adjusted under 35 U.S.C. 154(b) by 555 days.

(21) Appl. No.: 11/649,800

(22) Filed: Jan. 5, 2007

(65) Prior Publication Data
US 2007/0202935 A1 Aug. 30, 2007

(30) Foreign Application Priority Data
Feb. 28, 2006 (KR) .................. 10-2006-0019644
Mar. 31, 2006 (KR) .................. 10-2006-0029923

(51) Int. Cl.
*H04M 1/00* (2006.01)
(52) U.S. Cl. ............ 455/575.4; 455/550.1; 455/556.1; 455/90.3; 455/575.1; 200/18; 200/4; 200/5 R
(58) Field of Classification Search ............ 455/575.4, 455/550.1, 556.1, 556.2, 575.1, 90.3; 200/4, 200/5 R, 6 A, 11 R, 14, 17 R, 18, 570
See application file for complete search history.

(56) References Cited

U.S. PATENT DOCUMENTS

| | | | |
|---|---|---|---|
| 4,590,338 A | 5/1986 | Suzuki | |
| 4,963,876 A * | 10/1990 | Sanders et al. | 341/176 |
| 5,412,165 A | 5/1995 | Malone et al. | |
| 5,436,954 A | 7/1995 | Nishiyama et al. | |
| 5,689,095 A | 11/1997 | Kawase | |
| 6,097,964 A * | 8/2000 | Nuovo et al. | 455/566 |
| 6,211,474 B1 * | 4/2001 | Takahashi | 200/18 |
| 6,218,635 B1 * | 4/2001 | Shigemoto et al. | 200/570 |
| 6,291,782 B1 | 9/2001 | Isikawa | |
| 6,333,473 B1 * | 12/2001 | Sawada et al. | 200/4 |
| 6,340,801 B1 * | 1/2002 | Fukuda et al. | 200/18 |
| 6,370,362 B1 * | 4/2002 | Hansen et al. | 455/90.1 |
| 6,388,212 B1 * | 5/2002 | Ishihara et al. | 200/18 |
| 6,571,086 B1 * | 5/2003 | Uusimaki | 455/90.3 |
| 6,628,970 B2 * | 9/2003 | Nishiyama et al. | 455/564 |
| 6,759,933 B2 | 7/2004 | Fallak | |
| 6,774,322 B2 * | 8/2004 | Morinishi et al. | 200/5 R |
| 6,782,242 B1 * | 8/2004 | Koleda et al. | 455/90.3 |
| 6,810,272 B2 * | 10/2004 | Kraft et al. | 455/566 |
| 6,813,509 B2 * | 11/2004 | Aquilar et al. | 455/550.1 |
| 6,862,459 B2 * | 3/2005 | Yoritsune et al. | 455/550.1 |
| 6,865,404 B1 * | 3/2005 | Tikkala et al. | 455/566 |

(Continued)

FOREIGN PATENT DOCUMENTS

CN 1497928 A 5/2004

(Continued)

*Primary Examiner*—Edward Urban
*Assistant Examiner*—RuiMeng Hu
(74) *Attorney, Agent, or Firm*—Birch, Stewart, Kolasch & Birch, LLP (57) ABSTRACT

A mobile phone is provided that includes a first body, a second body slidably connected to the first body, and an input device formed in the second body. The input device includes a roller member rotatably supported in the second body, the roller member defining a rotational axis, and at least one button pivotally mounted adjacent the roller member along the rotational axis of the roller member.

8 Claims, 6 Drawing Sheets

U.S. PATENT DOCUMENTS

| | | | |
|---|---|---|---|
| 6,965,782 B1 * | 11/2005 | Nuovo et al. | 455/550.1 |
| 6,967,293 B1 * | 11/2005 | Chen et al. | 200/14 |
| 7,082,323 B2 * | 7/2006 | Yang | 455/575.1 |
| 7,092,495 B2 * | 8/2006 | Kraft et al. | 379/88.11 |
| 7,094,980 B2 * | 8/2006 | Ahn | 200/18 |
| D542,285 S * | 5/2007 | O'Neil et al. | D14/247 |
| 7,495,700 B2 * | 2/2009 | Watanabe | 348/239 |
| 7,502,636 B2 * | 3/2009 | Sakuta et al. | 455/575.1 |
| 7,528,331 B2 * | 5/2009 | Bricaud et al. | 200/18 |
| 7,602,377 B2 * | 10/2009 | Kim | 345/169 |
| 2001/0004584 A1 * | 6/2001 | Aquilar et al. | 455/90 |
| 2001/0044317 A1 * | 11/2001 | Prior et al. | 455/550 |
| 2002/0086698 A1 * | 7/2002 | Sawada et al. | 455/550 |
| 2002/0155856 A1 * | 10/2002 | Nishimoto | 455/550 |
| 2002/0155857 A1 * | 10/2002 | Nishimoto | 455/550 |
| 2003/0162540 A1 * | 8/2003 | Nielsen | 455/425 |
| 2004/0198460 A1 * | 10/2004 | Sakuta et al. | 455/566 |
| 2005/0113154 A1 * | 5/2005 | Park et al. | 455/575.4 |
| 2005/0189203 A1 | 9/2005 | Kodani et al. | |
| 2005/0261019 A1 * | 11/2005 | Lee et al. | 455/550.1 |
| 2005/0272462 A1 * | 12/2005 | Okamoto | 455/550.1 |
| 2005/0282597 A1 * | 12/2005 | Park et al. | 455/575.4 |
| 2006/0038786 A1 | 2/2006 | Adan et al. | |
| 2007/0218943 A1 * | 9/2007 | Takeuchi | 455/556.1 |
| 2009/0137279 A1 * | 5/2009 | Silfverberg | 455/566 |

FOREIGN PATENT DOCUMENTS

| | | |
|---|---|---|
| CN | 2746674 Y | 12/2005 |
| CN | 2755874 Y | 2/2006 |
| DE | 197 15 360 A1 | 10/1998 |
| EP | 1 206 101 A2 | 5/2002 |
| KR | 10-2004-0034420 A | 4/2004 |

* cited by examiner

FIG. 1

BACKGROUND ART

MOBILE TERMINAL

CROSS REFERENCE TO RELATED APPLICATIONS

This application claims priority to Korean Patent Application Nos. 10-2006-0029923, filed Mar. 31, 2006, and 10-2006-0019644, filed Feb. 28, 2006, and are both herein incorporated by reference.

BACKGROUND OF THE INVENTION

1. Field of the Invention

The present invention is generally directed to a mobile terminal, and more particularly, a mobile terminal having an input device that includes both a roller member and at least one button adjacent the roller member.

2. Description of Related Art

Many electrical devices include an input device that is configured to control some aspect or function of the electrical device. These electrical devices may be mobile terminals, which in turn can take the form of cellular phones, PDAs (Personal Digital Assistant), and the like, which a user can carry with himself/herself to send/receive various kinds of information, such as images, voices, and text massages via wireless communication or to receive various services via connection to a predetermined server.

Because a mobile terminal performs a wireless communication function in addition to various other functions in correspondence with a user's demand, such as play music, videos, and take pictures, the mobile terminal often includes an input device that is configured to control one or more functions of the mobile terminal and may allow for various forms of input.

For example, U.S. Pat. No. 6,333,473 to Sawada et al discloses an input device that is both rotatable and pressable to provide signals. In particular, the input device can provide five different signals (two signal based on rotation and three signals based on a downward displacement). As described in the patent, the input device includes a frame member 24 and two pressable switches 22A and 22B. The three signals generated by a downward displacement are generated by pressing switch 22A individually, pressing switch 22B individually, and pressing switches 22A and 22B simultaneously. The two rotation signals are based on the rotation direction of a knob 25. As described in the patent, when either switch is pressed independently, most of the pressing force is applied to that switch, however, because of the frame configuration 24, some force is applied to the opposite switch.

As such, that the switches are repeatedly exposed to more force than is necessary. In addition, because it is difficult to press both switches 22A and 22B simultaneously, a separate timing function has to be provided to determine whether a user desired to generate the third signal by pressing both switches 22A and 22B. As a result, additional power is consumed while waiting to detect the pressing of both switches 22A and 22B.

Figure 1:
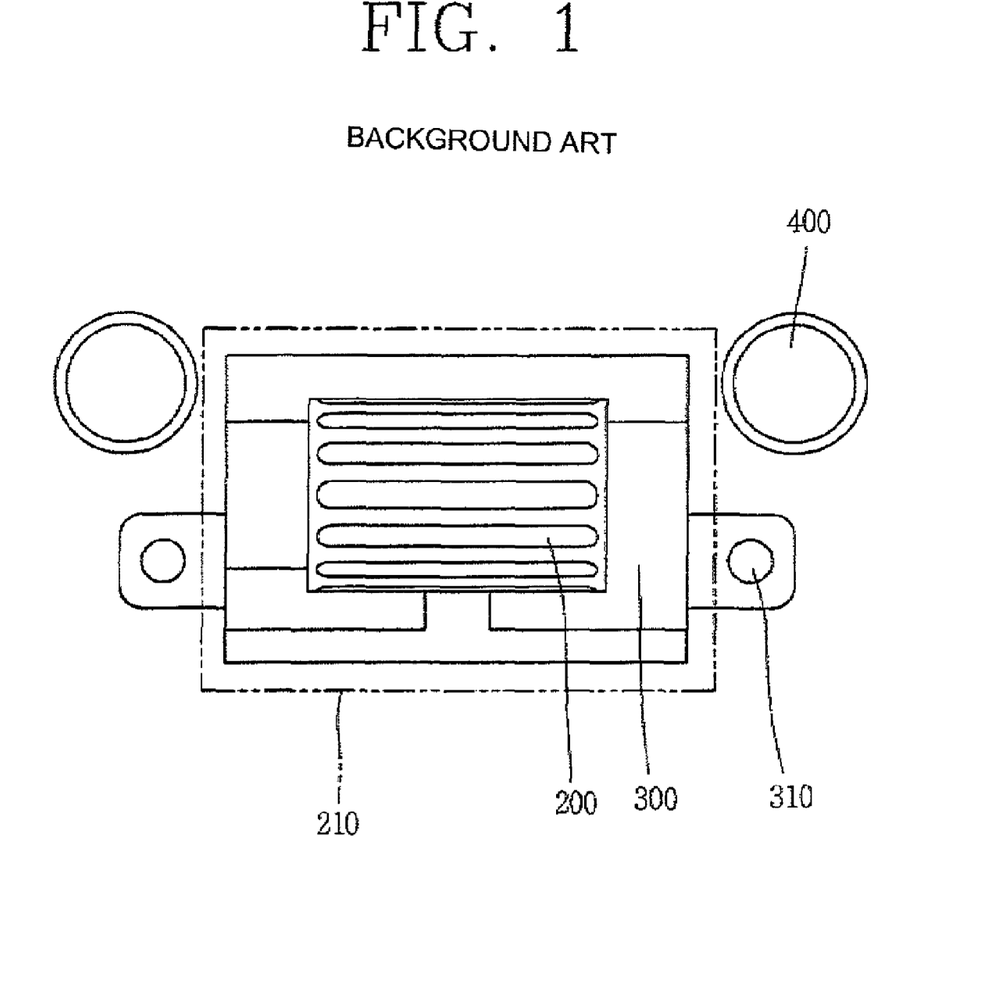
FIG. 1 shows an input device according to conventional art.

To address this problem, an input device, as shown in FIG. 1, can be provided that generates two rotation signals and a single pressing signal. A rotation member 200 is provided on a body 300. Press switches 400 are provided to either side of the rotation member 200, however due to the size of a user's fingers, the press switches have to provide a minimum spacing 210 to ensure that they are not pressed when the rotation member 200 is utilized.

Because electronic devices, and mobile terminals in particular, are becoming slimmer, spacing of components is very important. As a result, the input device shown in FIG. 1 leaves wasted space.

BRIEF SUMMARY OF THE INVENTION

Therefore, there is a need to provide a compact input device that allows for separating pressing signals in addition to rotary signals.

According to principles of this invention, a mobile phone is provided that includes a first body, a second body slidably connected to the first body, and an input device formed in the second body. The input device includes a roller member rotatably supported in the second body, the roller member defining a rotational axis, and at least one button pivotally mounted adjacent the roller member along the rotational axis of the roller member.

In another aspect, the input device further includes a base, a frame pivotally connected to the base, wherein the roller member is rotatably supported by the frame, and the at least one button is pivotally connected at a side of the base.

In another aspect, the at least one button includes a pair of buttons and each button is located on the base near opposite ends of the roller member.

In a different aspect, the roller member includes a cylindrical body and a shaft portion. The shaft portion is supported on the frame.

In a further aspect, the input device includes a circuitry supporting substrate located under the base, a rotation sensor module that senses rotation of the roller member, a portion of the rotation sensor module being located on the circuitry supporting substrate, and a plurality of switches located on the circuitry supporting substrate, wherein one of the plurality of switches is located under the frame and another of the plurality of switches is located under the at least one button. The portion of the rotation sensor module located on the circuitry supporting substrate may be a rotation sensor. The rotation sensor module may also include a ring magnet located on the shaft portion of the roller member, and the ring magnet may have a plurality of alternating North and South poles.

In still a further aspect, the input device may include a click magnet located between the ring magnet and the frame. The click magnet is configured to provide slight resistance to the rotation of the roller member.

In another aspect, the input device may include an elastic pad located between the circuitry supporting substrate and the frame.

In another aspect, the first body may include a keypad and the second body may include a display module.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Reference will now be made in detail to an exemplary embodiment of the present invention, which is illustrated in the accompanying drawings. Hereinafter, an input device and electronic device incorporating the input device according to the present invention will be explained in more detail. In addition, while the present invention is explained by reference to a sliding type mobile terminal, it is equally suitable for other mobile terminals including bar type, swivel type, and folding type mobile terminals as well other electronic devices.

Figure 2:
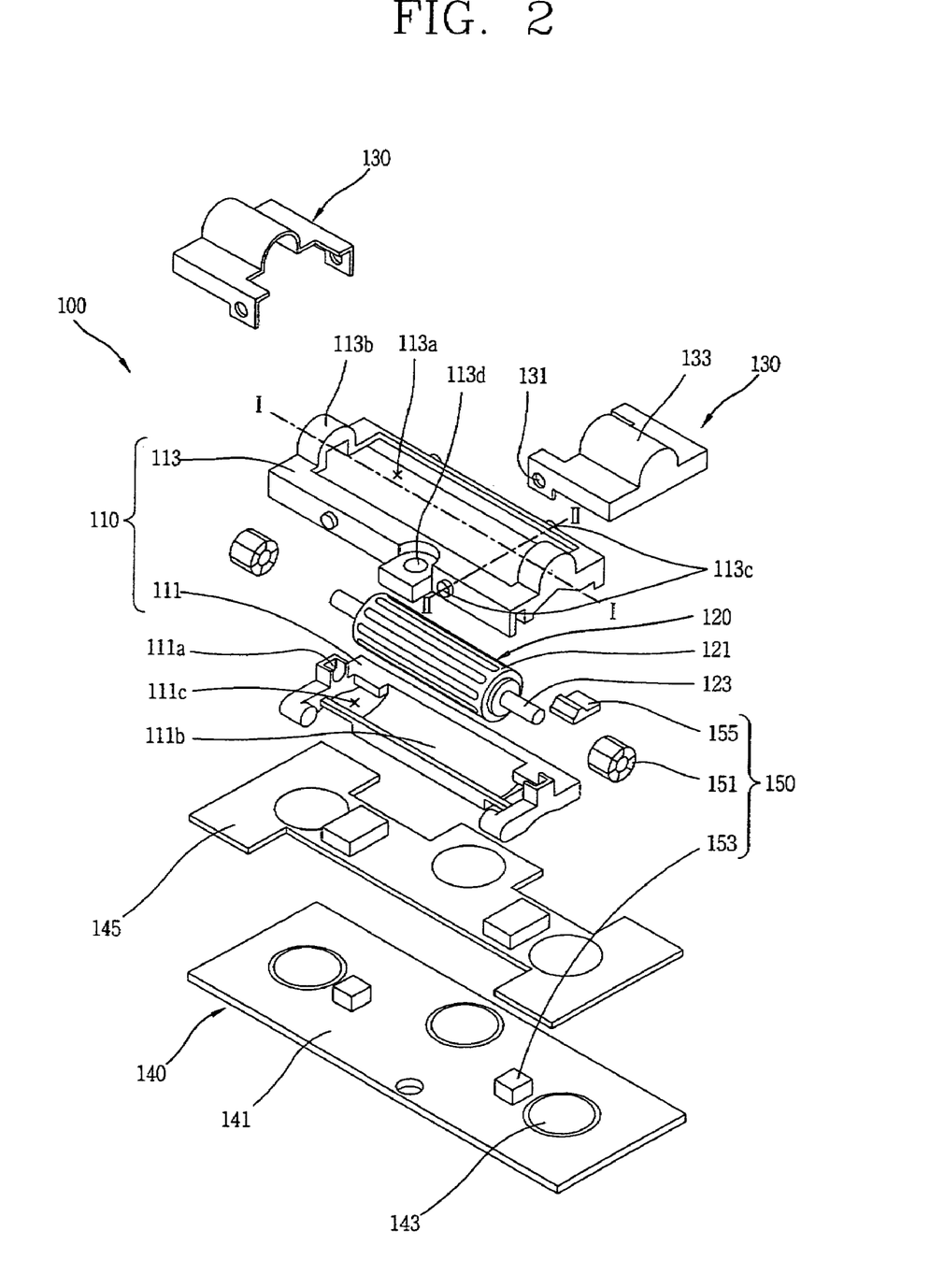
FIG. 2 shows an exploded perspective view of an input device according to an exemplary embodiment of the present invention.
Figure 3A:
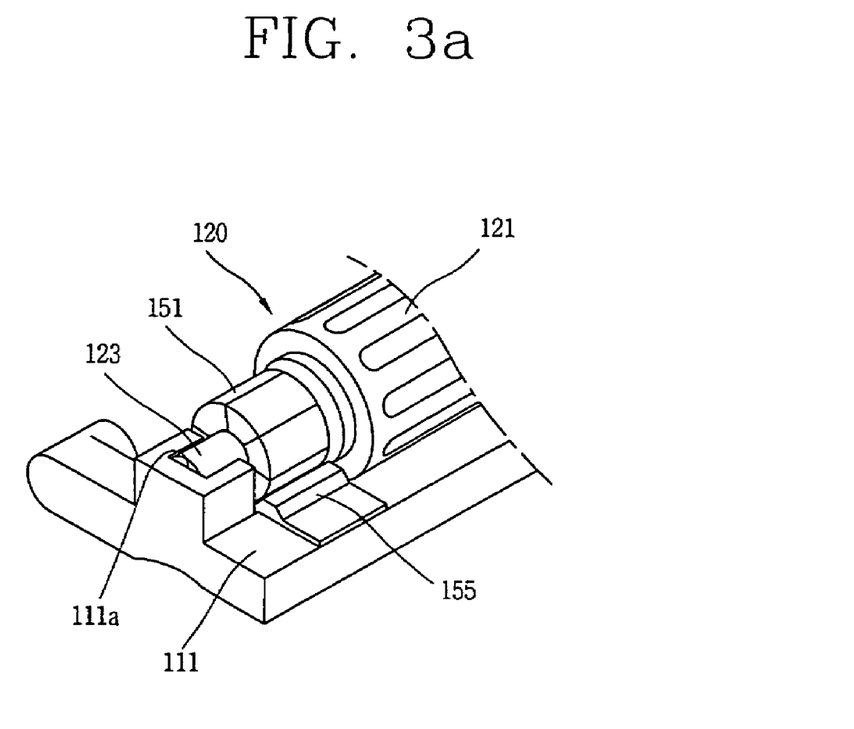
FIG. 3A shows a partial view of the input device of FIG. 2 in an assembled arrangement and FIG. 3B shows a schematic of a magnetic arrangement provided in the input device of FIG. 2.
Figure 3B:
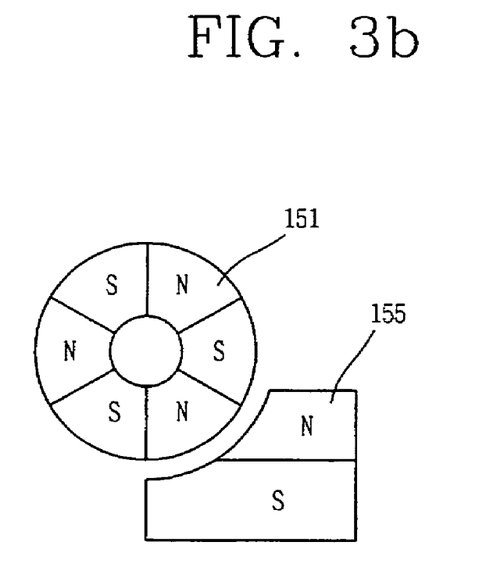
Figure 4:
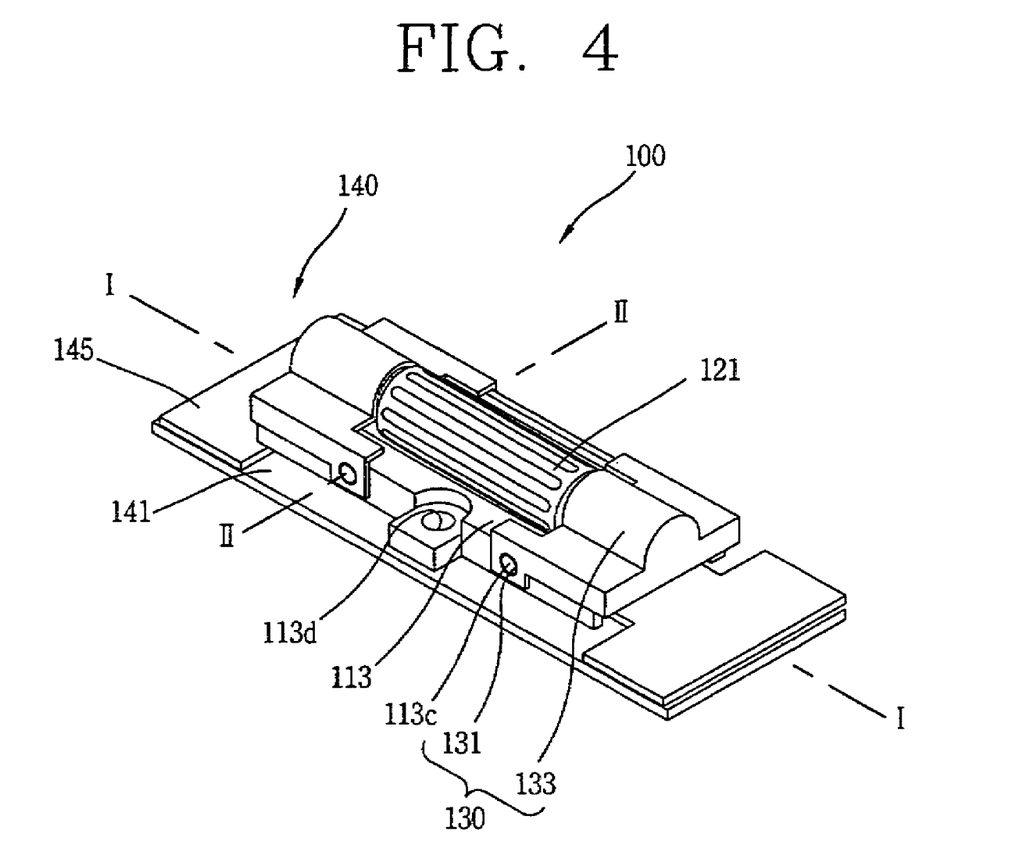
FIG. 4 shows the input device of FIG. 2 in an assembled arrangement.

As seen in FIGS. 2-4, an input device 100 includes a body portion 110 configured to pivotally and rotatably support a roller member 120 and to pivotally support a pair of buttons 130. Preferably an upper surface 133 of each button 130 is shaped to have the same radius of curvature as the roller member to provide a smooth and continuous appearance. It is understood that only a single button may be provided. A signal detection member 140 is located beneath the body 110 and is configured to detect rotational movement and/or a pressing force via a rotation sensor module 150 and a plurality of switches 143, respectively, as will be described in detail below.

The body portion 110 includes a base 113 and a frame 111 pivotally attached to the base 113 such that the frame 111 supports the roller member 120 and allows the roller member 120 to be pressed downward with respect to the base 113. In particular, the roller member 120 includes a cylindrical body 121 and shaft portions 123 that are supported in the frame 111 by support members 111a. It is understood that the shaft portions 123 could be a single shaft with the cylindrical body 121 attached to the shaft or each shaft portion could be attached at the ends of or formed integral with the cylindrical body 121. The frame 111 also includes a lower surface 111b that is shaped to allow the roller member to rotate in the frame 111. A pair of cutout portions 111c is formed in the lower surface 111b to avoid interfering with the rotational sensor module 150.

The base 113 defines an open region 113a that allows the roller member 120 to partially extend through the base 113 while being supported by the frame 111. Arched portions 113b are formed on opposite sides of the base and serve to secure the shaft 123 of the roller member between the base 113 and the frame 111 and defines the location of the rotational axis I-I for the input device 100. A base mounting portion 113d is provided on one edge of the frame 113 so that the frame 113 can be mounted to the signal detection member 140. More particularly, the frame 113 is attached to a circuitry supporting substrate 141 of the signal detection member 140. Finally, button supports 113c are formed on the base 113 to connect the buttons 130 to the base via connection holes 131 formed in the buttons 130.

The input device 100 generates a signal when the roller member 120 is rotated or pressed downwards towards the signal detection member 140. Specifically, the rotation sensor module 150 detects the forward and reverse rotation of the roller member 120 within the frame 113 and converts that rotation to a signal. One of the switches 143 is arranged beneath the roller member 120 such that a downward displacement of the roller member 120 causes the frame 111 to contact the switch 143. The depressed switch then transmits a signal.

The input device 100 also generates a signal when one of the switches 143 located underneath a corresponding button 130 is depressed. As mentioned above, each of the buttons 130 is pivotally connected to the base 113 via a pair of button supports 113c. The button supports 113c corresponding to each button 130 define a pivot axis II-II about which the corresponding button 130, 133 pivots.

An elastic pad 145 is located between the frame 111 of the body 110 and the signal detection member 140. The elastic pad may be formed of rubber, silicone, or other elastic material and assists in protecting the signal detection member 140. As shown in FIG. 2, the elastic pad includes a plurality of raised surfaces that correspond to the switches 143 and other elements formed on the circuitry supporting substrate 141.

The circuitry supporting substrate 141 is preferably a thin member. Each of the plurality of switches 143 is preferable a dome switch.

As shown in FIG. 2, the rotation sensor module 150 includes a ring magnet 151 and a sensor 153, such as a Hall IC that is configured to detect rotation of the ring magnet 151. In particular, a ring magnet 151 is located on each of the shaft portions 123. As shown in FIG. 3B, the ring magnet includes a plurality of alternating North and South poles. The Hall IC can detect the rotation of the roller member 120 via the rotation of the ring magnet and can output a signal based on that rotation.

The rotation sensor module 150 can also include a click magnet 155 that provides a clicking feeling to the user. As shown in FIGS. 3A and 3B, the click magnet 155 is supported by the frame 111 and is disposed underneath the ring magnet 151. In the particular embodiment shown, the click magnet has a North pole arranged above the South pole and facing the ring magnet such that the rotation of the roller member alternates the poles of the ring magnet near the click magnet 155. This causes the feeling of clicking for the user as the roller member 120 prefers to be in a state where the poles of the ring magnet 151 complement the poles of the click magnet. As a result, if the roller member is stopped at position where a North pole on the ring magnet is facing a North pole on the click magnet, the roller member is urged to move forward or backward until the poles of the ring magnet 151 complement the poles of the click magnet 155.

In addition to providing a clicking feeling, the click magnet helps retard the rotation of roller member by providing a slight resistance to the rotation of the roller member 120. In other words, the roller member 120 is not free to continue rotating after a rotational force is applied.

The assembled input device 100 is shown in FIG. 4. As noted above, the cylindrical member 121 extends through the base 113, which is attached to the circuitry supporting substrate 141 via the base mounting portion 113d and is rotatable about rotation axis I-I. Buttons 130 cover the ends of the base and are pivotable about the pivot axis II-II defined by the button supports 113c. Both the circuitry printable substrate 141 and elastic pad 145 are partially visible. It is evident that the input device 100 can readily receive rotational force applied to the cylindrical body 121 and that the cylindrical body can rotate within the base 113. In this manner, a compact input device can be provided where the amount of wasted space between components is minimized.

A pressing or rotational force can be applied to the cylindrical body 121 and to the buttons 130 such that the cylindrical body 121 and buttons 130 engage the signal detection member 140. Each of the signals generated by the switches 143 and the rotation detection module 150 can be used to cause different effects in conjunction with a mobile terminal. For example, the rotational motion of the roller member 120 can be used as a scroll function to scroll up and down, while the pressing motion on the buttons can be used to scroll left and right. There are many different functions that can be associated with the operation of the input device 100.

Figure 5:
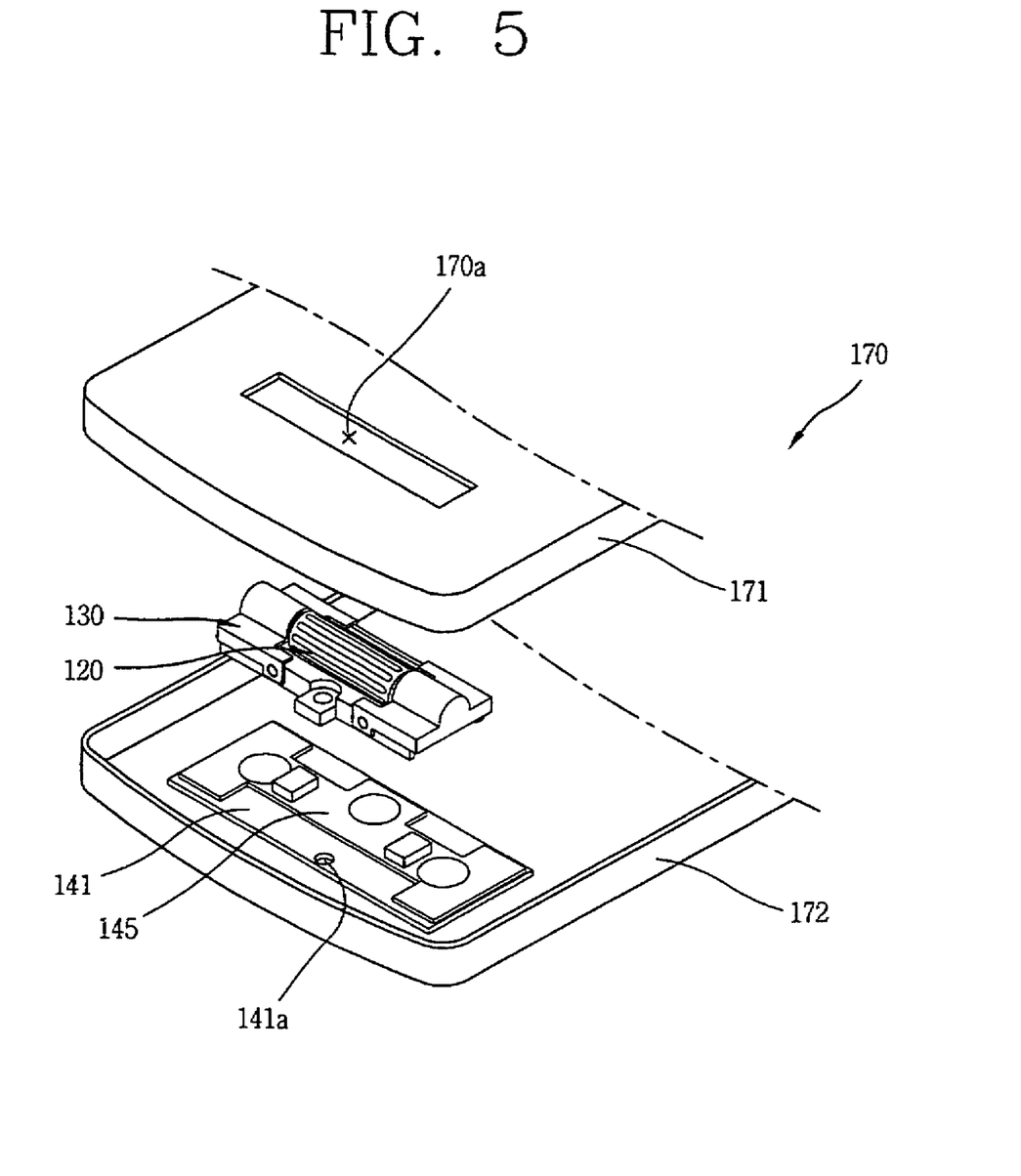
FIG. 5 shows an exploded perspective view of a mobile terminal incorporating the input device of FIG. 2.
Figure 6:
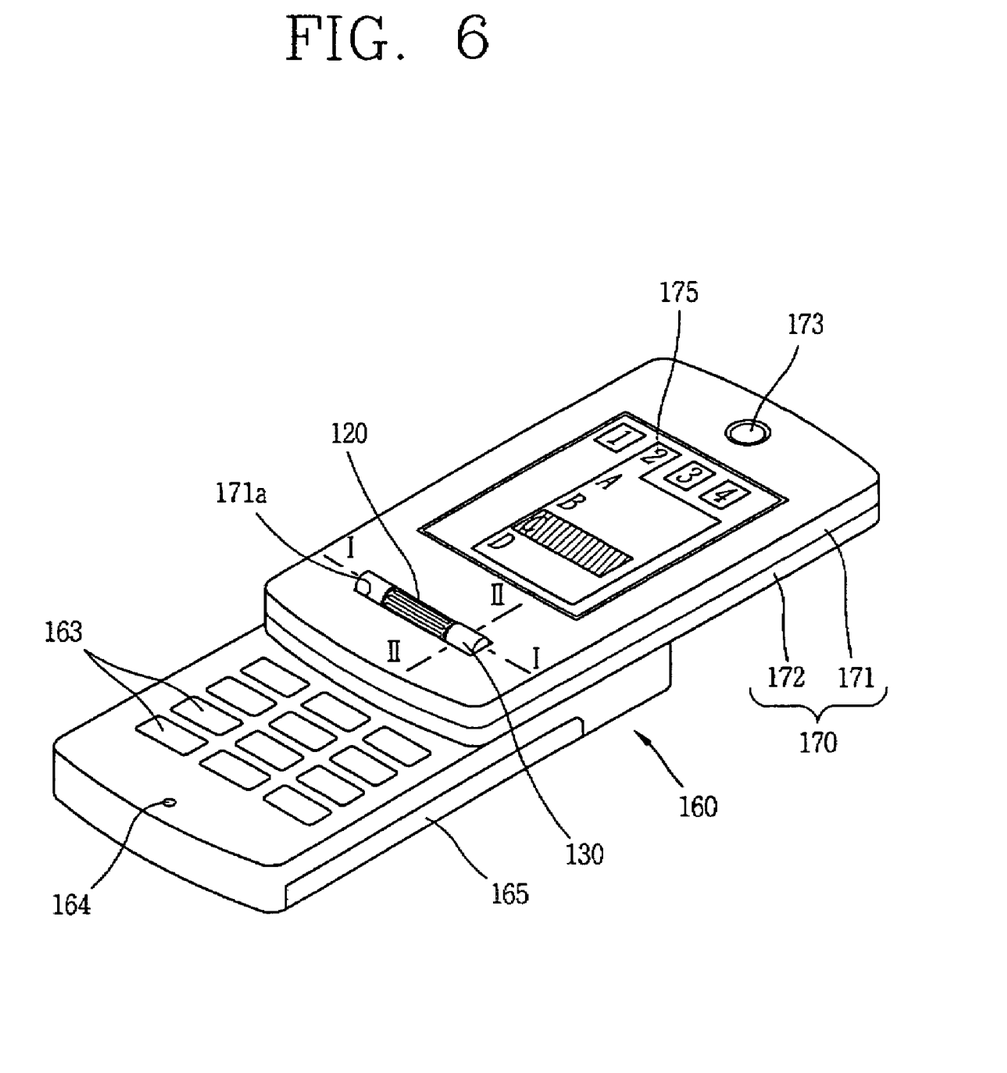
FIG. 6 shows a perspective view of the mobile terminal of FIG. 5 in an assembled arrangement.

A sliding type mobile terminal having a first body 160 and a second body 170 slidably attached to the first body 160 is shown in FIGS. 5 and 6. With particular reference to FIG. 5, an input device similar to the one describe above is incorporated into the second body 170.

The second body 170 includes an upper portion 171 and a lower portion 172. The upper portion 171 includes an opening 171a through which the roller member 120 and buttons 130 can extend. The circuitry supporting substrate 141 is located in the lower portion 172 of the second body 170. The input device includes the base mounting portion 113d and is attached to the circuitry supporting substrate 141 via a mounting hole 141a. The elastic pad 145 is located on the circuitry supporting substrate 141. It is understood that the circuitry supporting substrate 141 could be sized differently and/or configured to run other modules in the second body 170, such as a display module 171 (shown in FIG. 6).

The second body 170 includes a speaker 173 and a display module 175. The display module 175 cooperates with the circuitry supporting substrate 141 to allow a user to control the display via the roller member 120 and buttons 130. As best shown in FIG. 6, menu selection can be performed by moving left and right using buttons 130 to select an item 1 to 4 and scrolling up and down using the roller member 120 within the selected item 2. In addition, the roller member can be used as an enter key by pressing the roller member 120 downwards to select sub-item C. As noted above, there are many different functions that can be assigned to the roller member 120 and buttons 130, and the above examples are not intended to be exhaustive.

The first body 160 includes a keypad 163 and a microphone 164. As shown in FIG. 6, the roller member 120 and buttons 130 are exposed through the opening 171a in the second body. The first body 160 also allows information to be inputted by the keypad 163. The first body 160 may also contain a battery compartment 165 for energizing the mobile terminal.

Accordingly the present invention provides the following effects and advantages.

First, because the roller member is located on a pivotable frame, which in turn is mounted to the base, and the buttons are mounted on the base a more compact input device can be provided.

Second, because of the versatility of the input device, it can be utilized to operate many different components of a mobile terminal, such as a camera, video player, or other additional components without having separate buttons set up for each function of the various components.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A mobile terminal comprising:
    a first body;
    a second body slidably connected to the first body, the second body having a first opening; and
    an input device mounted in the first opening, the input device including:
        a roller member rotatably supported in the second body, the roller member defining a rotational axis;
        a base within the second body, the base having a second opening for providing a space for positioning the roller member;
        a pair of buttons pivotally connected to the base adjacent to the opposite ends of the roller member along the rotational axis, the roller member and the pair of buttons protruding from the first opening;
        a frame below and pivotally connected to the base to pivot with respect to the base, the frame being configured to allow the roller member to rotate about the rotational axis; and
        a circuitry supporting substrate below the base and the frame, the circuitry supporting substrate having at least one rotation sensor for sensing the rotation of the roller member and having a plurality of switches operateable by pressing the pair of buttons or the roller member.

2. The mobile terminal according to claim 1, wherein the roller member includes a cylindrical body and a shaft portion, the shaft portion being supported on the frame.

3. The mobile terminal according to claim 1, wherein the rotation sensor module includes a ring magnet located on the shaft portion of the roller member, the ring magnet having a plurality of alternating North and South poles.

4. The mobile terminal according to claim 3, further comprising a click magnet located between the ring magnet and the frame, the click magnet being configured to provide slight resistance to the rotation of the roller member.

5. The mobile terminal according to claim 1, further comprising an elastic pad located between the circuitry supporting substrate and the frame.

6. The mobile terminal according to claim 2, further comprising a ring magnet located on the shaft portion of the roller member, the ring magnet having a plurality of alternating North and South poles.

7. The mobile terminal according to claim 1, wherein the first body includes a keypad and the second body includes a display module.

8. A mobile terminal comprising:
    a terminal case having a first opening; and
    an input device mounted in the first opening, the input device including:
        a roller member rotatably supported in the second body, the roller member defining a rotational axis;
        a base within the terminal case, the base having a second opening for providing a space for positioning the roller member;
        a pair of buttons pivotally connected to the base adjacent to the opposite ends of the roller member along the rotational axis, the roller member and the pair of buttons protruding from the first opening;

a frame below and pivotally connected to the base to pivot with respect to the base, the frame being configured to allow the roller member to rotate about the rotational axis; and a circuitry supporting substrate below the base and the frame, the circuitry supporting substrate having at least one rotation sensor for sensing the rotation of the roller member and having a plurality of switches operatable by pressing the pair of buttons or the roller member.

* * * * *